United States Patent
Nolan et al.

(10) Patent No.: US 6,661,790 B1
(45) Date of Patent: Dec. 9, 2003

(54) PACKET MULTICASTING IN A RING ARCHITECTURE

(75) Inventors: Jerome Nolan, Dublin (IE); Kevin Jennings, Dublin (IE); Kam Choi, Tring (GB); John Hickey, Ratoath (IE); Edele O'Malley, Dublin (IE)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/369,326

(22) Filed: Aug. 6, 1999

(30) Foreign Application Priority Data

May 1, 1999 (GB) .............................. 9910064

(51) Int. Cl.⁷ .......................... H04L 12/56; H04L 12/42
(52) U.S. Cl. ........................................ 370/392; 370/403
(58) Field of Search ................................ 370/432, 258, 370/460, 393, 372, 475, 400, 401, 402, 403, 404, 405, 406

(56) References Cited

U.S. PATENT DOCUMENTS

| | | | | |
|---|---|---|---|---|
| 4,434,463 A | * | 2/1984 | Quinquis et al. | 370/393 |
| 4,536,873 A | | 8/1985 | Leete | |
| 6,278,709 B1 | * | 8/2001 | Walker et al. | 370/392 |

FOREIGN PATENT DOCUMENTS

| | | |
|---|---|---|
| EP | 0006798 A1 | 1/1980 |
| EP | 0346904 A2 | 12/1989 |
| GB | 2226737 A | 7/1990 |
| GB | 2336076 A | 10/1999 |
| JP | 6-177912 | 6/1994 |

\* cited by examiner

*Primary Examiner*—Chau Nguyen
*Assistant Examiner*—Soon-Dong Hyun
(74) *Attorney, Agent, or Firm*—Nixon & Vanderhye, PC

(57) ABSTRACT

The present invention is based on a ring architecture wherein each chip in the multiplicity of chips is connected in a chain so that it can receive packets from the next previous chip in the chain and forward packets to the next following chip in the chain, whereby to form a ring. Before a packet is placed on the ring by a device it is provided with a 'masking' field which identifies each of the other devices and the ports within any such device to which the packet must be sent in order to achieve a multicast. When a device in its turn receives such a packet it will examine the masking field to determine whether the field identifies that device. If so, the packet, which may be held in temporary storage, may be processed for forwarding from a port of that device. The device will strip from the masking field the identification of the respective device and transmit the packet with a thus modified masking field to the next device in turn. If a packet does not contain any indication of another device in the ring, the packet will not be transmitted and therefore will naturally terminate.

11 Claims, 4 Drawing Sheets

PACKET MULTICASTING IN A RING ARCHITECTURE

FIELD OF THE INVENTION

The present invention relates generally to packet-switched communication networks and in particular to a method and architecture for controlling the passage of packets between individual switching devices in a switch which contains a multiplicity of such devices. The term 'switch' is used generically herein to include bridges, routers and other devices which direct received packets to one or more ports. The invention is generally concerned with achieving efficient multicasting of packets received by any one of the individual switching devices and which may have to be cast from either the same device or any one of the other devices or all of them.

BACKGROUND OF THE INVENTION

It is known to compose a high speed switch from a multiplicity of media access control devices, which may be constituted by individual 'chips'. The chips each possess a multiplicity of ports at which packets may be received and (on the assumption of duplex working) from which packets may be cast. It is necessary to link the individual devices or chips together so that a packet received on a port of any particular chip can be cast on any of the transmit ports provided on any of the other devices or chips. For this purpose, each device (hereinafter called simply 'chip') will normally comprise buffering for each port and a processor or switching ASIC which for any received packet will perform a look-up to determine the port or ports from which the packet must be cast. In general, if a look-up process fails, in that there is no indication of a particular port or particular ports to which the packet should be sent, it is necessary to broadcast the packet on all the available ports It is known to partition a network artificially into virtual local area networks in order to limit the need to broadcast packets to all available ports, but this known technique is not otherwise relevant to the invention.

It is known to connect chips using a shared bus, and in a system which employs a shared bus it is necessary to employ a switching controller that is master of the shared bus and makes all forwarding decisions. The bandwidth of all the ports sharing the bus is equal to the bandwidth required on the shared bus and there is a limit to the speed and therefore feasible bandwidth that can be achieved employing a shared bus.

SUMMARY OF THE INVENTION

The present invention is based on a ring architecture wherein each chip in the multiplicity of chips is connected in a chain so that it can receive packets from the next previous chip in the chain and forward packets to the next following chip in the chain, whereby to form a ring. Before a packet is placed on the ring by a device it is provided with a 'masking' field which identifies each of the other devices and the ports within any such device to which the packet must be sent in order to achieve a multicast. When a device in its turn receives such a packet it will examine the masking field to determine whether the field identifies that device. If so, the packet, which may be held in temporary storage, may be processed for forwarding from a port of that device. The device will strip from the masking field the identification of the respective device and transmit the packet with a thus modified masking field to the next device in turn. If a packet does not contain any indication of another device in the ring, the packet will not be transmitted and therefore will naturally terminate.

A modification of such a scheme is to provide two such chains, thereby to form a double ring in which packets proceed in a respective different sense around each ring.

The invention is more fully described in the following with reference to the accompanying drawings.

DETAILED DESCRIPTION

Figure 1:
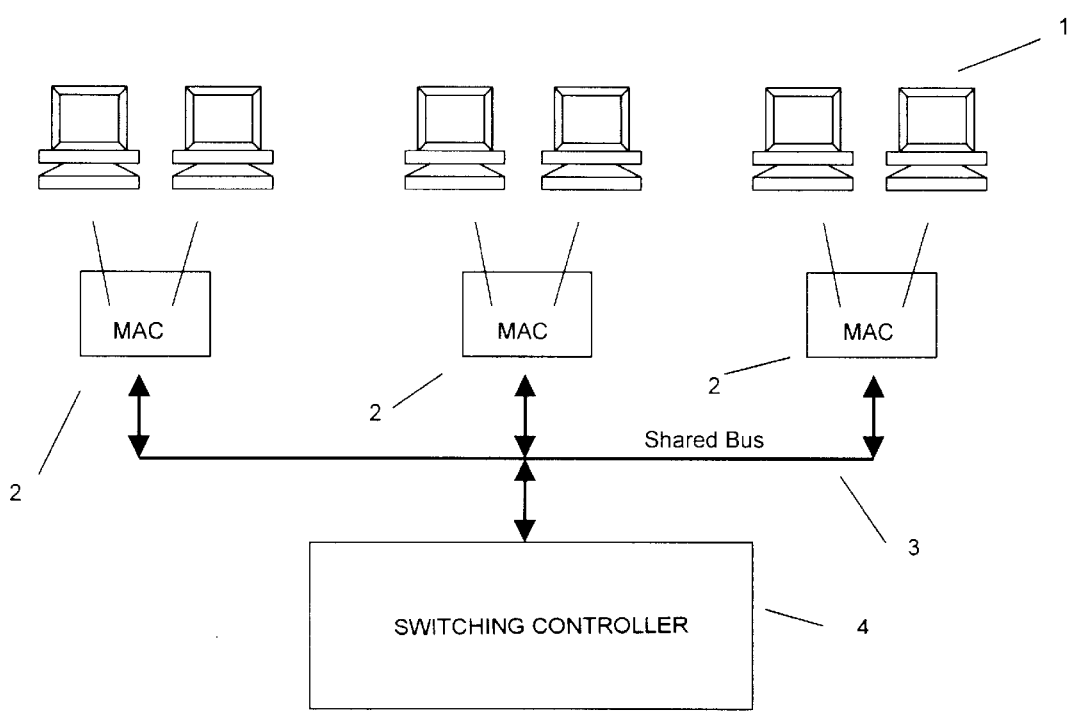
FIG. 1 illustrates a known switching architecture employing a multiplicity of media access control chips connected by a shared bus.

FIG. 1 illustrates a known form of shared bus architecture wherein a multiplicity of users 1 are connected by a switching architecture composed of a multiplicity of media access control devices 2 which share a common bus 3 and access to the bus is controlled by a switching controller 4. Each media access control device 2 has a multiplicity of ports which can receive from or send packets to a respective group of users 1. A packet received by any particular media access control device 2 which requires packets to be sent from any other device 2 must obtain access to that other device by way of the shared bus.

There are broadly two disadvantages with a scheme such as shown in FIG. 1. First, the device 4 represents an extra and different chip which has to be included in a switching device that comprises the chips 2. Second, the bandwidth available to the chips 2 is limited by the feasible bandwidth that can be provided by the bus 3. Typically the bus may be a time slotted bus of known form.

Figure 2:
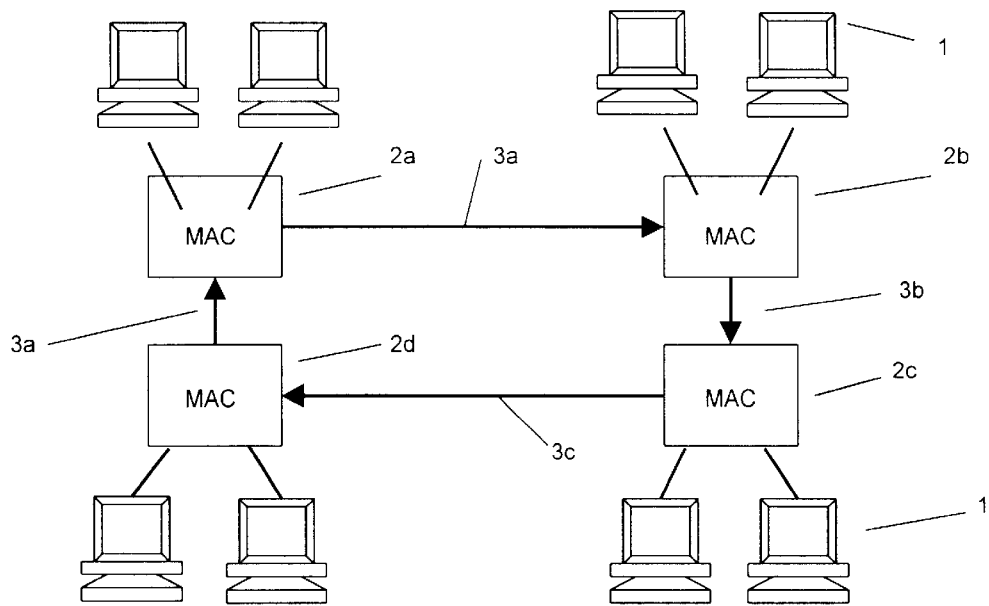
FIG. 2 illustrates schematically a first switching architecture according to the invention.

FIG. 2 illustrates one form of switching architecture according to the invention.

In the architecture shown in FIG. 2, each of the media access control devices, 2a, 2b, 2c and 2d, is connected in a ring in the sense that each can transmit packets to, and only to, its next neighbour around the ring and can receive packets only from its previous neighbour on the ring. Thus, the media access control (MAC) device 2a can transmit packets only to media access control device 2b by way of the link 3a and can receive packets only from the media access control device 2d by way of the link 3d and so on. The manner in which a multicast transmission is achieved using a system as shown in FIG. 2 will be described later with reference to FIGS. 4 and 5.

Broadly however, each MAC device will perform its own look-up on packets received on its own ports. A packet which is destined for a port or ports on the same MAC device will be forwarded internally on that device to the relevant port or ports. Packets that are for ports of other MAC devices will be forwarded to the next device in the manner to be described.

Figure 3:
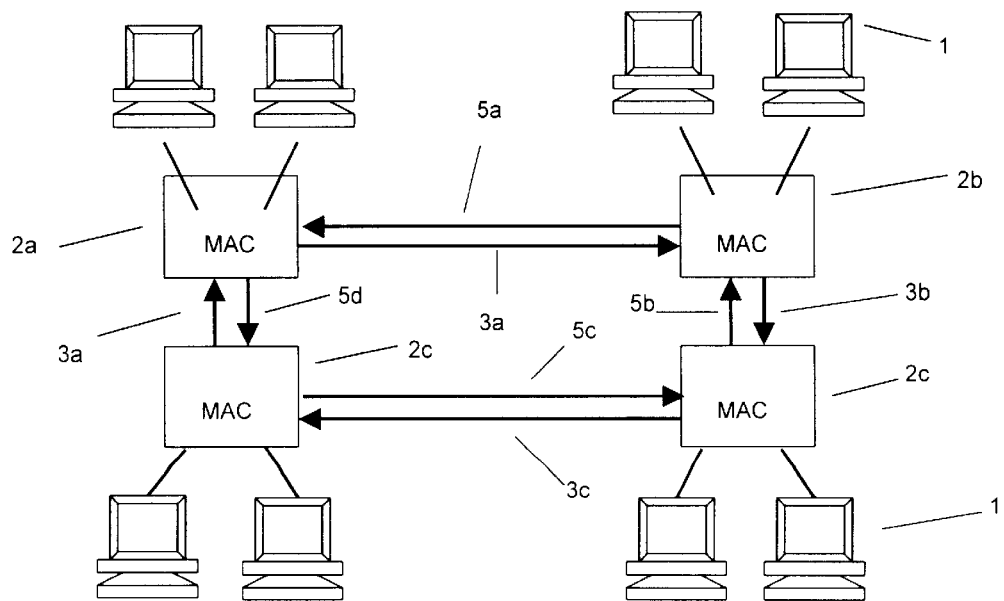
FIG. 3 illustrates a second switching architecture according to the invention.

In the modified system shown in FIG. 3, the devices are connected in two rings, one constituted by the rings 3a to 3d between the respective MAC devices and the other being constituted by the links 5*d* to 5*a* linking the devices in the opposite direction. Each device includes means which, depending on the location of a destination port, causes half the traffic to be sent out on one ring, and the other half on the other ring.

Both the systems shown in FIGS. 2 and 3 allow for multiple packets between different chips to be transferred at the same time due to the availability of multiple links. A frame will go out on to a link from any one of the chips if there is not a frame that is being received by the same chip on its passage around the ring. Although that means that some by-pass buffering is required, it may be minimized since packets in the by-pass buffer may be caused to have a higher priority than frames which are yet to be put on the ring by the same chip.

Figure 4:
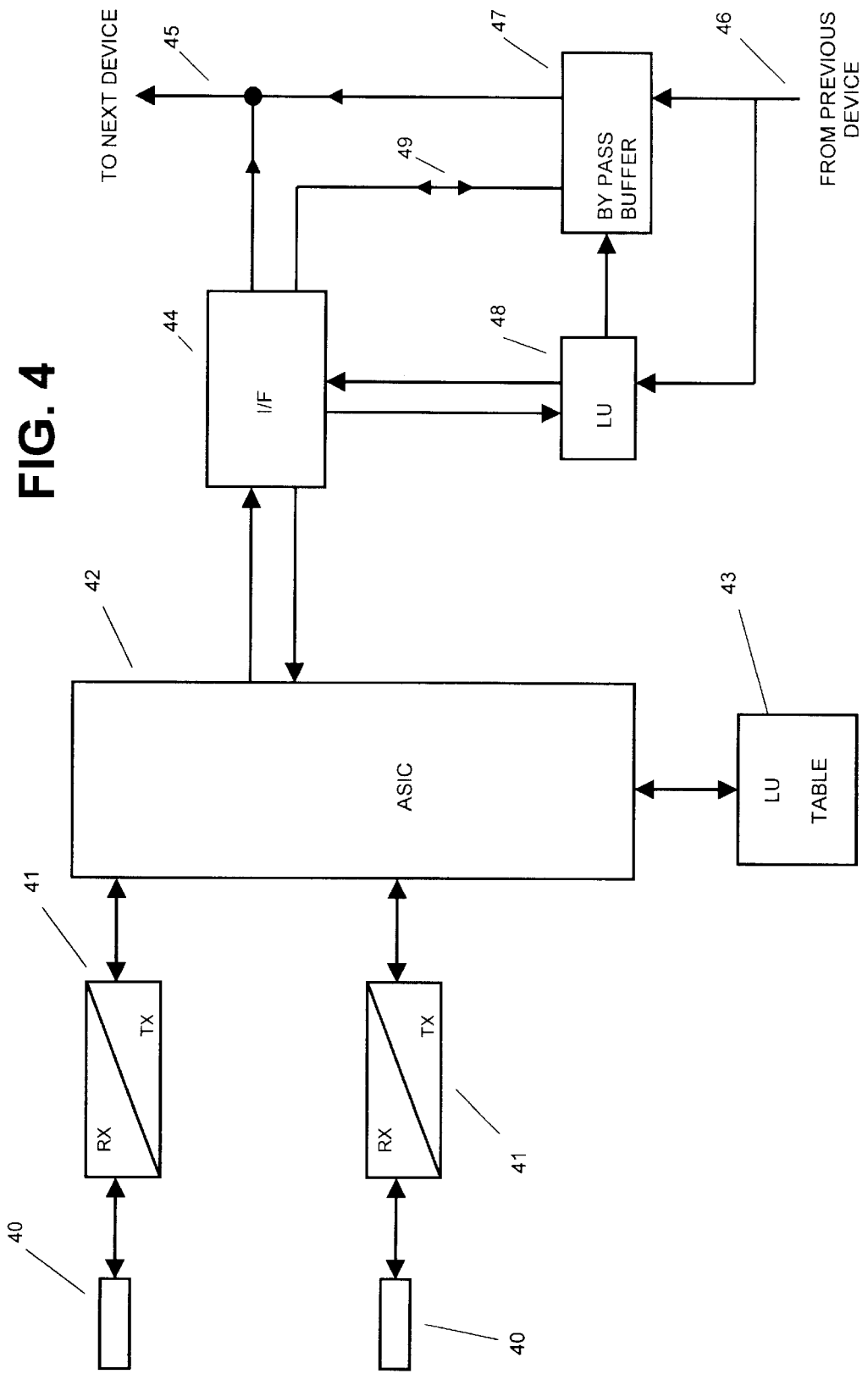
FIG. 4 illustrates schematically a single media access control device according to the invention.

FIG. 4 illustrates a typical architecture for a chip to be used in a system according to the invention.

The device or chip shown in FIG. 4 has a multiplicity of ports 40 which in this example are capable of duplex working, so that each port can both receive packets and send them. Each port is allotted buffer space 41, which may be organised according to known techniques, for example by allotting a dedicated space in SRAM and controlling the loading and unloading of the receive buffer space (RX) and the transmit buffer (TX) by means of respective pointers controlled by a switching ASIC 42. In any convenient manner, packets received on a port 40 are subject to a look-up by means of a look-up table 43 to determine which ports are required for a multicast of the packet. For the sake of conformity with the example of a bit mask given later, the chip is shown as having two ports.

The look-up process will determine the ports in the complete system from which a packet is to be multicast and will furthermore encapsulate a packet with a field which identifies each of the other chips that possess the ports from which the packet is to be multicast. As is explained with reference to FIG. 5, this field may be constituted by a bit mask which separably indicates each of the other devices in the ring.

It will be understood that the system being described can inherently cope with a unicast transmission since that will be a special case of a multicast transmission wherein only one port and therefore only one device will be required to forward the packet.

As will also be explained with reference to FIG. 5, the provision of the device identifying field may, in general, identify only the self-same device as the one from the ports of which the packet is to be sent.

Packets including the bit mask will, if the packets are to be sent out onto the ring, be directed to an interface 44 which examines the bit mask to determine whether it is to be put out on the link 45 to the next device. The interface 44 is also arranged to examine the bit masks of packets which are received by way of the link, shown here as 46, from the previous device in the ring. Such packets will be held in a by-pass buffer 47 while their bit mask is examined to see whether it contains an indication that the packets should be transmitted by ports of this device.

The interface is interconnected with a look-up table 48 which compares the bit mask of either a packet held in the by-pass 47 or a packet which is to be placed on the link 45 by means of the interface 44. The interface 44 should normally include storage such as a FIFO since a packet will not be put on the ring unless its bit mask indicates that it should be put on the ring, i.e. on the link 45, and there is no interference with a packet already on the ring, being held for the present in the by-pass buffer 47. A control connection 49 may be employed for the interface to determine whether there is a packet or packets in the by-pass buffer waiting for transmission on the device 45 whereby the interface 44 can inhibit the placing of packets on the buffer. The control connection 49 may also be bidirectional so that the interface can cause the buffer to release a packet on to the link 45 if the bit mask indicates that forward transmission of the packet is appropriate.

Since packets are being sent around a ring it is necessary to provide some means of stopping them looping infinitely around the ring. Although it is possible to terminate a packet when it has returned to its originating MAC chip, such a scheme has the disadvantage of using links when the packet has been delivered to all its recipients. This would be especially wasteful for a dual ring solution (FIG. 3) since it should only be necessary to send frames to the opposite corner of the ring out of each link. The present invention provides for modification of the bit mask as it goes through each device, with the chip removing the respective indication of that device from the bit mask and then checking to see whether there are still bits set in the bit mask before transmitting the packet further around the ring.

Figure 5:
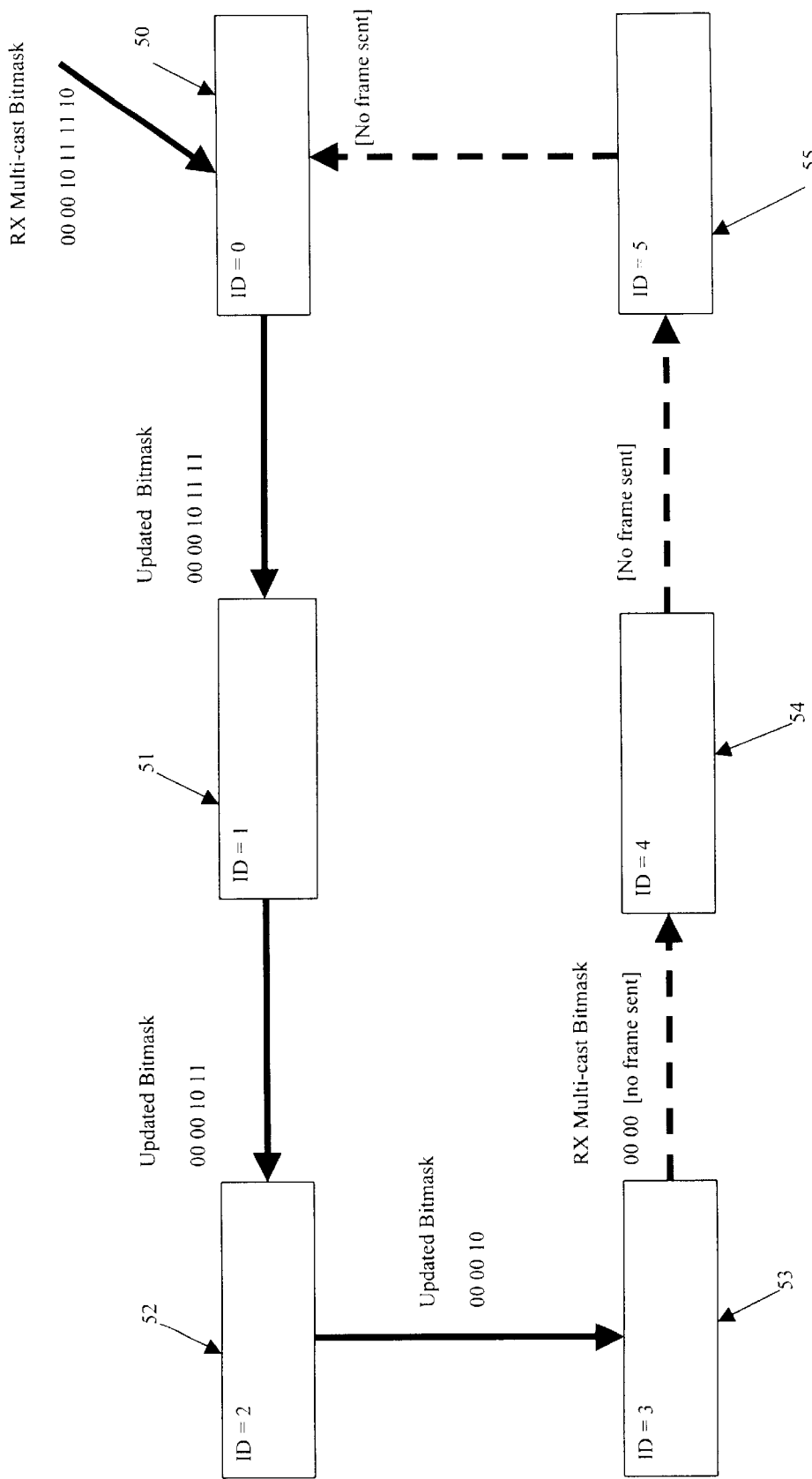
FIG. 5 is an explanatory diagram showing the modification of a bit mask as a packet proceeds around a chain of devices according to the invention.

FIG. 5 illustrates the progress of a bit mask around the ring in more detail. In FIG. 5, there are shown six devices 50 to 55, each of which has two ports.

It is presumed that packets will be transmitted anticlockwise around the ring so that a packet received on a port belonging to port 50 and requiring transmission around the ring will be transmitted first to device 51, then to device 52 and so on.

The multicast bit mask applied to the packet before it leaves device 50 is a six times two-bit mask in which each group of two bits is specific to a respective one of the devices 50 and each bit in each group represents a specific port. In the present example, the packet is to be multicast from a port or ports belonging to each of devices 50, 51, 52 and 53 but not from ports 54 and 55. Thus in this example the bit mask as initially generated is as follows:

00 00 10 11 11 10.

In this example, the bottom of the word is the right-hand group of two bits and indicates that there should be a transmission from one of the two ports of the device 50. Thus the packet will be transmitted by way of ASIC 42 to a respective port 40. The strips the indication of device 50 from the bit mask, so that the bit mask will become:

00 00 10 11 11 [00 ].

The square brackets indicates the bits that have been stripped. The packet is transmitted out on the respective link 45 to the next device, in this case device 51. When that device examines the bit mask, it will determine that the relevant bit mask group (the second group of two bits now at the bottom of the word) identifies this device, so that this group will be stripped, the packet forwarded to the two ports on the chip and the packet transmitted out on the link 45 from the by-pass buffer 47 where it has been temporarily stored while the bit mask has been examined in the respective look-up table 48.

When the packet with the updated bit mask is transmitted from device 51, it will have the form:

00 00 10 11 [00 00].

The process previously described continues until the packet with its updated bit mask reaches device 53. At this point, the only device indicated in the bit mask is device 53, so that after that indication is stripped from the bit mask, the bit mask is constituted by all zeroes. This is a convenient mechanism for preventing further transmission of the packet around the ring. Thus the links between device 53 and device 54 and between devices 54 and 55 and between devices 55 and 50 will not transmit the packet.

The advantage of the solutions is that it is easy to expand the number of chips in the ring, ensuring that the bit mask supports the total number of ports and that the latency around the ring is not significant. The solution is also a 'single chip' solution in that each chip in the ring is the same with its own complete switching functionality.

If the single ring structure in FIG. 5 is modified to a two ring structure then (for the example given) the packet can be sent anticlockwise with a bit mask (11 11 10), indicating transmission from one port of device 50 and both ports of devices 51 and 52, and clockwise with the bit mask (10 00 00) indicating no transmission from either of the ports of devices 55 and 54 and transmission from a particular port of device 53. The packets (frames) sent anticlockwise and clockwise will terminate at devices 52 and 53 respectively.

What is claimed is:

1. A network switch comprising:
    a plurality of similar media access control devices each of which includes a plurality of ports for receiving and sending data packets and each including means for examining media access control data of a received packet to determine whether a packet should be cast from a port or ports of any other device in the plurality;
    means for applying to a packet a multi-bit field which identifies each of said other devices which contains a port from which the packets should be cast; and
    a respective connection from each device to the next so that the devices constitute a ring around which packets can be conveyed progressively from each device to the next,
    wherein each device includes:
        means for placing on the respective connection to the next device a packet when the said field identifies at least one other of the devices; and
        means for modifying said field to overwrite the identification of the respective device from a packet received by the device.

2. A network switch according to claim 1 wherein said field comprises a plurality of segments each of which is specific to a particular device in the plurality thereof.

3. A network switch according to claim 2 wherein each segment identifies the respective device as having a port for the transmission of a multicast packet when at least one bit in the segment is of a particular binary value, and wherein transmission of the packet from a device to the next is prevented when all the bits of the segments are in a binary state opposite the said particular binary value.

4. A network switch comprising:
    a plurality of media access control devices of which each includes ports for receiving and sending data packets, wherein each device examines media access control data of a received packet to determine whether a packet should be cast from a port or ports of any other device in the plurality;
    means for applying to a packet a field which has a plurality of segments, each segment corresponding to a respective one of said devices, wherein each such segment indicates whether said packet should traverse the respective one of said devices; and
    a respective connection from each device to the next so that the devices constitute a ring around which packets can be conveyed progressively from each device to the next,
    wherein each device on receipt of a packet having a said field:
        (a) modifies the respective field to indicate that the packet having said field has traversed the respective device;
        (b) places on the respective connection to the next device said packet having said field when said field indicates that said packet having said field should traverse at least one other of the devices; and
        (c) prevents further transmission of said packet having said field when said field indicates that the packet has no other device to traverse.

5. A network switch as in claim 4 wherein said field constitutes a bit mask.

6. A network switch as in claim 4 wherein each segment indicates that a packet should traverse a respective device when at least one bit in that segment is of a particular binary value, and wherein transmission of the packet from a device to the next is prevented when all the bits of all the segments are in a binary state opposite the said particular binary value.

7. A network switch comprising:
    a plurality of media access control devices connected in a closed ring, each of said media access control devices including a plurality of ports for receiving and sending data packets;
    means for applying to a packet a field which has a segment corresponding to a respective one of each of said other devices, wherein at least one such segment comprises at least one bit of a particular binary value; and
    a respective connection from each device to the next so that packets can be conveyed progressively from each device to the next,
    wherein each device on receipt of a received packet having a field as aforesaid:
        (a) modifies said field by changing said at least one bit of the respective segment to the opposite binary value;
        (b) places said received packet on the respective connection to the next device when said field as thus modified has at least one bit of the said particular binary value; and
        (c) prevents further transmission of said received packet around said ring when all the bits in said field are of said opposite binary value.

8. A media access control device for use in a ring of devices and including a plurality of ports for receiving and sending data packets, wherein the media access control device:
    (a) receives a packet having a field which has a segment corresponding to a respective one of each of the devices in said ring, wherein each such segment indicates whether said packet should traverse said respective one of said devices;
    (b) modifies said field to indicate that said packet has traversed the media access control device;
    (c) sends said packet to a subsequent device in the ring when said field indicates that said packet should traverse at least one other of the devices; and
    (d) prevents further transmission of said packet when said field indicates that said packet has no other device to traverse.

9. A media access control device as in claim 8 wherein each segment comprises at least one bit having a particular binary value to indicate that the packet should traverse the respective device and wherein said media access control device modifies said field by setting said at least one bit to an opposite binary value.

10. A media access control device for use in a ring of devices, wherein the media access control device:
(a) receives a packet having a field which has a segment corresponding to a respective one of each of the devices in said ring, wherein each such segment comprises at least one bit which indicates by a particular binary value whether said packet should traverse a respective one of said devices;
(b) modifies said field by setting said at least one bit of the segment corresponding to the media access control device to an opposite binary value, whereby to indicate that said packet has traversed the media access control device;
(c) sends said packet to a subsequent device in the ring when said field includes at least one bit of said particular binary value which indicates that the packet should traverse at least one other of the devices; and
(d) prevents further transmission of said packet when said field comprises bits all of said opposite binary value.

11. A network switch comprising:

a plurality of similar media access control devices each of which includes a plurality of ports for receiving and sending data packets and each including means for examining media access control data of a received packet to determine whether a packet should be cast from a port or ports of any other device in the plurality;

means for applying to a packet a multi-bit field which identifies each of said other devices which contains a port from which the packets should be cast; and a respective connection from each device to the next so that the devices constitute a ring around which packets can be conveyed progressively from each device to the next, wherein each device includes:
means for placing on the respective connection to the next device a packet when the said field identifies at least one other of the devices; and
means for modifying said field to replace the identification of the respective device from a packet received by the device.

* * * * *

UNITED STATES PATENT AND TRADEMARK OFFICE
CERTIFICATE OF CORRECTION

PATENT NO. : 6,661,790 B1
DATED : December 9, 2003
INVENTOR(S) : Nolan et al.

It is certified that error appears in the above-identified patent and that said Letters Patent is hereby corrected as shown below:

<u>Title page</u>,
Item [73], Assignee, delete "3Com Technologies, Georgetown (KY)" and insert therefor -- 3Com Corporation, Santa Clara, California --.

Signed and Sealed this

Sixth Day of April, 2004

JON W. DUDAS
*Acting Director of the United States Patent and Trademark Office*